United States Patent [19]

Tanimoto et al.

[11] 4,122,786
[45] Oct. 31, 1978

[54] PROGRAMMABLE STITCH PATTERN FORMING CONTROL IN AN ELECTRONIC SEWING MACHINE

[75] Inventors: Akira Tanimoto, Kashihara; Sanao Katoh, Yamatokoriyama; Yukihiro Yoshida, Ikoma, all of Japan

[73] Assignee: Sharp Kabushiki Kaisha, Osaka, Japan

[21] Appl. No.: 796,238

[22] Filed: May 12, 1977

[30] Foreign Application Priority Data

May 14, 1976 [JP] Japan .............................. 51-55555
Jun. 18, 1976 [JP] Japan .............................. 51-72426
Jun. 23, 1976 [JP] Japan .............................. 51-74837

[51] Int. Cl.² ............................................. D05B 3/02
[52] U.S. Cl. ................................................. 112/158 E
[58] Field of Search ............ 112/121.12, 158 E, 121.11, 112/277, 275; 318/568, 569, 567

[56] References Cited

U.S. PATENT DOCUMENTS 3,872,808  3/1975  Wurst ........................... 112/158 E
3,987,739  10/1976  Wurst et al. ................. 112/158 E

FOREIGN PATENT DOCUMENTS 2,618,053  12/1976  Fed. Rep. of Germany ....... 112/158 E Primary Examiner—Peter Nerbun
Attorney, Agent, or Firm—Birch, Stewart, Kolasch & Birch

[57] ABSTRACT

Digital information related to plural kinds of stitch patterns is stored in a memory means such as an ROM disposed within an electronic sewing machine. A keyboard means is provided for selecting desired stitch patterns stored within the ROM at operator's choices. Output signals of the keyboard means are temporarily stored in a dynamic memory means such as a shift register. A digital control circuit is arranged so that the ROM develops signals related to the stitch pattern selected through the shift register, to thereby control a stitch forming mechanism.

24 Claims, 9 Drawing Figures

| PATTERN ① | ◊ | A | B |
|---|---|---|---|
| PATTERN ② | ⌇ | ◊ ① | ◊ ① |
| PATTERN ③ | ⌇ | ⌇ ③ | ◊ ① |
| PATTERN ④ | ♡ | ♡ ④ | ◊ ② |
|   | ┆ |   | ◊ ② |
|   |   |   | ◊ ② |
|   |   |   | ◊ ① |
|   |   |   | ◊ ① |

FIG. I

PROGRAMMABLE STITCH PATTERN FORMING CONTROL IN AN ELECTRONIC SEWING MACHINE

BACKGROUND OF THE INVENTION

The present invention relates to an electronic sewing machine, wherein a predetermined stitch pattern is automatically formed through the use of a needle positioning mechanism and a work feed mechanism controlled by digital information stored in a memory means installed within the electronic sewing machine.

A typical control system of the above-mentioned sewing machine is disclosed in John W. Wurst, U.S. Pat. No. 3,855,956 "SEWING MACHINE STITCH PATTERN GENERATION FROM STITCH DATA STORED IN STATIC MEMORY", patented on Dec. 24, 1974.

In this prior art system, digital information related to the positional coordinates for each stitch of a predetermined stitch pattern is stored in a read only memory (throughout the following specification the abbreviation ROM is used as a designation for the read only memory). The digital information stored in the ROM is applied directly to a driving means for controlling movement of a stitch forming instrumentality of the electromic sewing machine. The ROM stores digital information related to plural kinds of stitch patterns, and a desired stitch pattern is selected by an operator through a suitable selection means. The selection operation must be conducted every time to initiate the stitch forming operation in the above-mentioned electronic sewing machine of the prior art. That is, in the prior art electronic sewing machine, only one stitch pattern is formed after selection of a desired stitch pattern. There is a great possiblility that plural kinds of stitch patterns are desired to be continuously formed. In this case, selection commands should be stored in a suitable memory means, to thereby automatically form stitch patterns of different kinds in a sequential fashion.

OBJECTS AND SUMMARY OF THE INVENTION

Accordingly, an object ot the present invention is to provide a novel control system for forming a stitch pattern in an electronic sewing machine.

Another object of the present invention is to provide a control system for continuously forming different kinds of stitch patterns in an electronic sewing machine.

Still another object of the present invention is to provide a programmable control system which automatically controls a stitch forming mechanism of an electronic sewing machine to continuously form different kinds of stitch patterns.

Other objects and further scope of applicability of the present invention will become apparent from the detailed description given hereinafter. It should be understood, however, that the detailed description and specific examples, while indicating preferred embodiments of the invention, are given by way of illustraiton only, since various changes and modificaitons within the spirit and scope of the invention will become apparent to those skilled in the art from this detailed description.

To achieve the above objects, pursuant to an embodiment of the present invention, digital information related to plural kinds of stitch patterns is stored in an ROM disposed within an electronic sewing machine. A keyboard means is provided for selecting desired stitch patterns stored within the ROM at operator's choices. Output signals of the keyboard means are temporarily stored in a dynamic memory means such as a shift register. That is, the shift register stores commands for selecting desired stitch patterns stored in the ROM, whereby the digital information related to the plural kinds of stitch patterns are sequentially derived from the ROM in accordance with the commands stored in the shift register.

In a preferred form, the shift register stores two kinds of commands, one concerning the kind of stitch pattern, and the other concerning a repetition number of the formation of the selected stitch pattern.

BRIEF DESCRIPTION OF THE DRAWINGS

The present invention will become more fully understood from the detailed description given hereinbelow and the accompanying drawings which are given by way of illustration only, and thus are not limitative of the present invention and wherein, FIG. 1 is a chart for explaining the operation of an electronic sewing machine of the present invention;

DESCRIPTION OF THE PREFERRED EMBODIMENTS

An electronic sewing machine of the present invention includes a memory means such as an ROM for storing digital information related to plural kinds of stitch patterns. Now assume that the ROM stores the digital information related to four (4) kinds of stitch patterns ① through ④ as shown in FIG. 1. When the operator selects the stitch patterns in the order of ①→③→②→④ through a suitable selection means, a stitch pattern (A) shown in FIG. 1 is automatically and continuously formed by the electronic sewing machine of the present invention. When the selection is conducted in the order of ①→①→①→②→②→②→①→①, a stitch pattern (B) shown in FIG. 1 is automatically and continuously formed.

Figure 2:
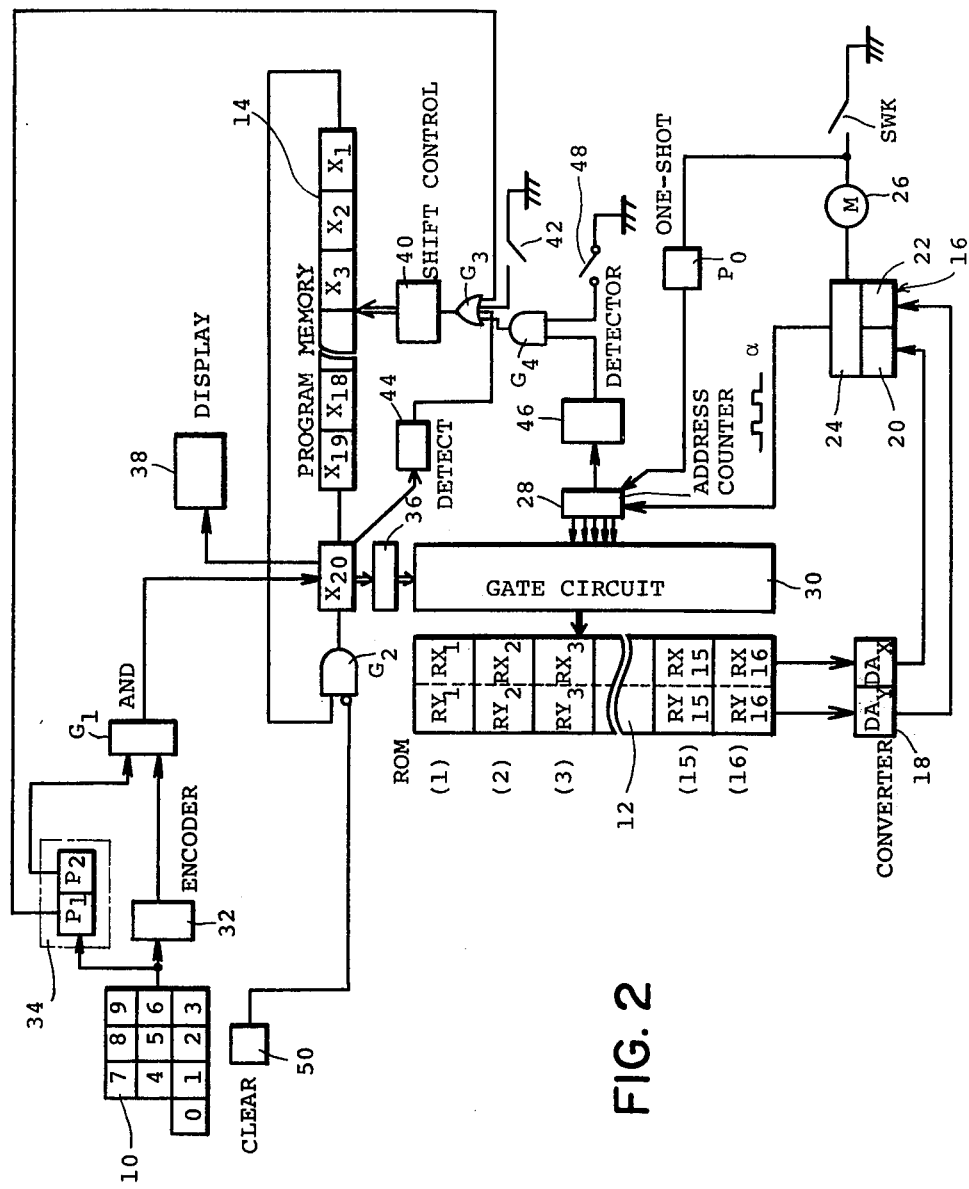
FIG. 2 is a block diagram of an embodiment of an electronic sewing machine of the present invention.

FIG. 2 shows a digital control circuit of an embodiment of an electronic sewing machine of the present invention.

The electronic sewing machine of the present invention mainly comprises a keyboard means 10, a memory means 12 made of a ROM, a program memory 14 made of a shift register, and a stitch forming section 16.

The ROM 12 stores digital information related to (16) stitch patterns (1) through (16). More specifically, the ROM 12 stores a set of digital information $RX_1$ and $RY_1$ related to the stitch pattern (1), another set of digital information $RX_2$ and $RY_2$ related to the stitch pattern (2), still another set of digital information $RX_3$ and $RY_3$ related to the stitch pattern (3), and a further set of digital information $RX_{16}$ and $RY_{16}$ related to the stitch pattern (16).

Figures 3, 4:
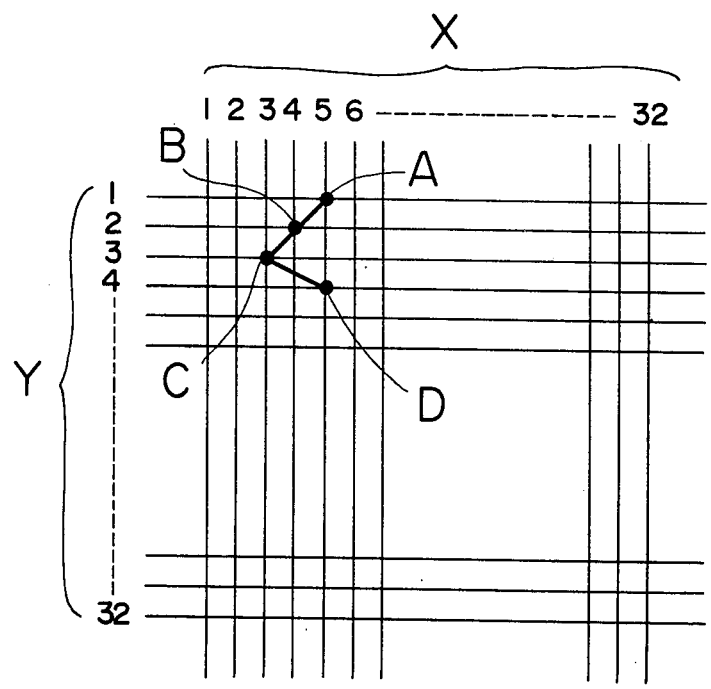
FIG. 3 is a chart for explaining the operation of the electronic sewing machine of FIG. 2.
FIG. 4 is a chart showing digital information stored in an ROM included within the electronic sewing machine of FIG. 2.

The respective digital information $RX_1$ and $RY_1$ through $RX_{16}$ and $RY_{16}$ comprises a set of digital information concerning stitch positions of each step for forming a particular stitch pattern. The digital information related to the respective stitch positions, for example, A, B, C, ... as shown in FIG. 3 of a particular stitch pattern is included within the digital information $RX_1$ and $RY_1$ stored in the ROM 12. The digital information $RX_1$ represents the stitch positions along the X-axis in a binary notation. That is, the digital information $RX_1$ relates to needle positions for respective stitches for forming a particular stitch pattern. The digital information $RY_1$ represents work feed lengths along the Y-axis in a binary notation. That is, the digital information $RY_1$ relates to work feed lengths for respective stitches for forming the particular stitch pattern.

When the stitch pattern shown in FIG. 3 is desired to be formed, the stitch positions of the first step, or, the stitch A is $X=5$ and $Y=1$. The stitch position of the second step, or, the stitch B is $X=4$ and $Y=2$. The stitch position of the third step, or, the stitch C is $X=3$ and $Y=3$.

Accordingly, the first, second and third steps of the $RX_1$ store the digital information "00101", "00100" and "00011", respectively. That is, the $RX_1$ stores the digital information in a binary notaiton related to the absolute position information of the respective stitches along the X-axis.

The first step of the $RY_1$ stores the digital information "00001", which corresponds to a shift value from the stitch A($Y=1$) to the stitch B ($Y=2$). The second step of the $RY_1$ stores the digital information "00001", which corresponds to a shift value from the stitch B($Y=2$) to the stitch C($Y=3$). That is, the $RY_1$ stores the digital information in a binary notation related to the relative position information of the respective stitches along the Y-axis.

In this system, the first stitch is formed after setting the needle position determined by the first step. Thereafter, the work feed is conducted in accordance with the information stored in the first step of the $RY_1$ and, then, the needle position is set in accordance with the information stored in the second step of the $RX_1$ to form the second stitch.

Alternatively, the first step of the $RY_1$ can store the absolute position information "00001" related to $Y=1$ of the stitch A. The second step of the $RY_1$ stores the digital information "00001", which corresponds to a shift value from the stitch A($Y=1$) to the stitch B($Y=2$). The third step of the $RY_1$ stores the digital information "00001", which corresponds to a shift length from the stitch B($Y=2$) to the stitch C($Y=3$).

In this case, the work feed is first conducted in accordance with the information stored in the first step of the $RY_1$, and the needle position is set in accordance with the information stored in the first step of the $RX_1$ to form the first stitch. After completion of the first stitch formation, the work feed is conducted in accordance with the information stored in the second step of the $RY_1$, and the needle position is set in accordance with the information stored in the second step of the $RX_1$, thereby forming the second stitch.

Since (32) positions are selectable for the respective stitches as shown in FIG. 3, the $RX_1$ and $RY_1$ comprise (5) bits, respectively, as shown in FIG. 4. The step number of the $RX_1$ and $RY_1$ corresponds to the number of stitch positions, for example, N.

Output signals of the ROM 12 are applied to the stitch forming section 16 through digital-to-analogue converters 18. More particularly, output signals of the RX are applied to a needle position control mechanism 20 included within the stitch forming section 16 through the digital-to-analogue converter $DA_X$, and output signals of the RY are applied to a work feed control mechanism 22 included within the stitch forming section 16 thorugh the digital-to-analogue converter $DA_Y$.

The stitch forming section 16 comprises the needle position control mechanism 20, the work feed control mechanism 22, and a needle penetration drive mechanism 24 which includes a synchronization pulse generator.

The needle penetration drive mechanism 24 is activated by a motor 26 only when a start SWK is closed. In a preferred form, the start switch SWK is associated with a switch which is actuated through a foot pedal. The needle penetration drive mechanism 24 develops a synchronization pulse $a$ in response to penetration operation of the needle. The needle position control mechanism 20 functions to control the needle position along the X-axis within a predetermined range. The work feed control mechanism 22 functions to control the work feed along the Y-axis.

An address counter 28 is provided for sequentially addressing the pattern information stored in the ROM 12 through a gate circuit 30. The address counter 28 is reset by a pulse derived from a pulse generator $P_O$, which develops a one-shot pulse when the start switch SWK is closed. The address counter 28 counts up to N in response to the synchronization pulse $a$ derived from the needle penetration drive mechanism 24. The address counter 28 is a ring counter, which automatically returns to an initial condition when the count operation is conducted to the N-th step.

The keyboard means 10 includes numeral keys (0) through (9) for selecting a desired stitch pattern stored in the ROM 12. Output signals of the keyboard means 10 are introduced into an encoder 32 and a sequential pulse generator 34.

Figure 5:
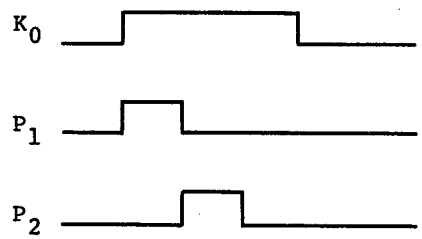
FIG. 5 is a time chart of control pulses occurring within the electronic sewing machine of FIG. 2.

The encoder 32 functions to encode the output signals of the keyboard means 10 and develops encoded signals toward an AND gate $G_1$. The sequential pulse generator 34 functions to sequentially develop signals $P_1$ and $P_2$ in response to key input signals derived from the keyboard means 10. FIG. 5 shows relationships between an key input signal $K_O$ and the signals $P_1$ and $P_2$ derived from the sequential pulse generator 34. The signal $P_2$ derived from the sequential pulse generator 34 is applied to the AND gate $G_1$ to render conductive the AND gate $G_1$.

The program memory 14 can be made of a shift register or a random access memory. In this embodiment, the program memory 14 is made of a shift register, which stores the stitch pattern numbers (1) through (16) selected through the keyboard means 10.

The program memory 14 includes registers $X_1$ through $X_{20}$ and has capacity for storing (20) kinds of digital information related to the selected stitch patterns. The register $X_{20}$ is connected to receive output signals of the AND gate $G_1$, whereby the coded signals for selecting the pattern information (1) through (16) stored in the ROM 12 are introduced into the register $X_{20}$. The register $X_{20}$ develops signals toward the gate circuit 30 via an decoder 36, and signals to a display means 38. The contents of the program memory 14 are circulated through an AND gate $G_2$ for sustaining purposes.

The contents of the program memory 14 are shifted in response to output signals of a shift control circuit 40. The shift control circuit 40 receives the signal $P_1$ derived from the sequential pulse generator 34 through an OR gate $G_3$, whereby the contents of the programme memory 14 are shifted by one block upon every occurrence of the signal $P_1$.

The shift control circuit 40 also receives an output signal of a manual switch 42, an output signal of an AND gate $G_4$, and a detection output derived from a detection circuit 44 through the OR gate $G_3$. The manual switch 42 is provided for shifting the contents of the program memory 14 when it is desired. The manual switch 42 is effective when the operator desires to check the program stored in the program memory 14 through the use of the display means 38, and when the operator desires to form a particular stitch pattern by shifting the command for selecting the particular stitch pattern into the register $X_{20}$.

The AND gate $G_4$ receives output signals of a detector 46 and a mode selection switch 48. The detector 46 develops an output signal when the address counter 28 counts up to "N". The mode selection switch 48 is closed when the electronic sewing machine is placed in the programmed mode wherein plural kinds of stitch patterns are selected and continuously formed. The mode selection switch 48 is open when the electronic sewing machine is placed in the manual mode wherein only one stitch pattern is formed.

Accordingly, when the detector 46 detects that the address counter 28 counts up to "N" under the condition where the mode selection switch 48 is closed and the electronic sewing machine is placed in the programmed mode, the AND gate $G_4$ develops the signal for shifting the contents of the program memory 14 by one block through the OR gate $G_3$ and the shift control circuit 40.

The detection circuit 44 detects whether the contents of the register $X_{20}$ included within the programme memory 14 are "zero". When the contents of the register $X_{20}$ are "zero", the detection circuit 44 develops an output signal to be applied to the shift control circuit 40 through the OR gate $G_3$. The contents of the program memory 14 are shifted by one block upon every occurrence of the output signal derived from the detection circuit 44.

The detection circuit 44 is effective when the stitch patterns below (20) are programmed in the program memory 14, even though the program memory 14 has the capacity for storing the (20) stitch patterns. The operator is required to operate the numeral key "(0)" to introduce the information "zero" into the program memory 14, when the programmed stitch pattern is achieved by the commands below (20). The block storing the information "zero" is automatically advanced without any access operation.

A clear key 50 is provided for clearing the contents stored in the program memory 14.

Operation of the control circuit of FIG. 2 will be described hereinbelow.

First, the keyboard means 10 is operated in order to select desired stitch patterns stored in the ROM 12. When the numeral key "1" is operated in order to select the stitch pattern (1) stored in the ROM 12, the key output is introduced into the encoder 32 and the sequential pulse generator 34. The sequential pulse generator 34 first develops the signal $P_1$, which is applied to the shift control circuit 40 through the OR gate $G_3$, thereby shifting the contents of the program memory 14 by one block. Thereafter, the sequential pulse generator 34 develops the signal $P_2$, which conducts the AND gate $G_1$, whereby the key output "1" is introduced into the register $X_{20}$ included within the program memory 14.

Subsequently, when the numeral key "2" is operated, the contents "1" stored in the register $X_{20}$ of the program memory 14 are shifted to the register $X_{19}$ in response to the occurrence of the signal $P_1$ derived from the sequential pulse generator 34. And the information "2" is introduced into the register $X_{20}$ in synchronization with the signal $P_2$.

In this way, a desired stitch pattern combination is programmed in the program memory 14. As already discussed above, the program memory 14 can store a program of (20) steps. In the case where the desired stitch pattern combination includes steps below (20), the operator should operate the numeral key "zero" to introduce the information "zero" into the program memory 14 until the first selected information "1" appears at the register $X_{20}$ of the program memory 14.

The information introduced from the keyboard means 10 into the register $X_{20}$ is indicated at the display means 38. When the operator desires to check the programmed information stored in the program memory 14, the manual switch 42 is closed to shift the contents stored in the program memory 14 throught the shift control circuit 40. While the contents of the program memory 14 are sequentially shifted, the contents shifted into the register $X_{20}$ are displayed at the display means 38. When the check operation is completed, the manual switch 42 is released.

After completion of introduction of the desired program into the program memory 14, the stitch formation is initiated. The mode selection switch 48 is closed to place the electronic sewing machine in the programmed stitch formation mode. The start switch SWK is closed to initiate the stitch forming operation. When the start switch SWK is closed, the motor 26 is activated, and the pulse generator $P_O$ develops the one-shot pulse to reset the address counter 28. The needle penetration drive mechanism 24 is driven by the motor 26, whereby the synchronization pulse signal $\alpha$ is developed in response to the needle penetration.

Figure 6:
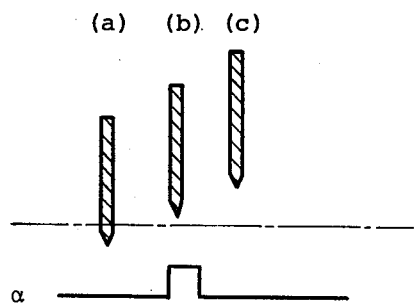
FIG. 6 is a chart for explaining a synchronization pulse signal α occurring within the electromic sewing machine of FIG. 2.

FIG. 6 shows the relationship between the needle penetration and the generation of the synchronization pulse signal $\alpha$. The synchronization pulse signal $\alpha$ is developed immediately after the needle is separated from the work as shown in a condition (b) of FIG. 6. In FIG. 6, (a) shows a condition where the needle reaches the lowermost position, and (c) shows a condition where the needle reaches the uppermost position.

The thus developed synchronization pulse signal $\alpha$ is introduced into the address counter 28, whereby the address counter 28 counts up upon every occurrence of the synchronization pulse signal $\alpha$.

The register $X_{20}$ of the program memory 14 stores the information "1", which is first selected through the keyboard means 10, whereby the stitch pattern (1) stored in the ROM 12 is selected. The information related to the stitch pattern (1) stored in the ROM 12 is sequentially developed in accordance with the count up operation of the address counter 28.

When the first step of the stitch pattern (1) is addressed, the $RX_1$ and $RY_1$ of the ROM 12 develop the stitch information of the first step to the D-A converters $DA_X$ and $DA_Y$. The output signal of the converter $DA_X$ is applied to the needle position control mechanism 20, and the output signal of the converter $DA_Y$ is applied to the work feed control mechanism 22 to control the needle position and the work feed to form the first stitch of the stitch pattern (1). The N steps are sequentially addressed to form the stitch pattern (1) stored in the $RX_1$ and $RY_1$ of the ROM 12.

When the stitch formation is conducted to the N-th step of the stitch pattern (1) stored in the ROM 12, the detector 46 develops the detection output which conducts the AND gate $G_4$. Accordingly, the shift control circuit 40 receives a signal through the OR gate $G_3$, whereby the contents of the program memory 14 are shifted by one block.

With this shift operation, the information "2", which is secondly introduced through the keyboard means 10, appears at the register $X_{20}$ to select the stitch pattern (2) stored in the ROM 12. The address counter 28 returns to the initial condition and, thereafter, counts up in response to the provision of the synchronization pulse signal α to sequentially address the $RX_2$ and $RY_2$ of the ROM 12.

In this way, the stitch patterns are formed in accordance with the programmed command stored in the program memory 14.

In this example, the program memory 14 has the capacity for storing (20) steps. In the case where the program has the steps less than (20), the remaining blocks store the information "zero" as already discussed above. When the information "zero" appears at the register $X_{20}$, the detection circuit 44 develops the output signal to shift the contents of the program memory 14 through the shift control circuit 40. Therefore, the programmed stitch patterns are continuously formed as long as the start switch SWK is closed.

When the operator desires to continuously form a particular stitch pattern, the mode selection switch 48 is opened. The information for selecting the particular stitch pattern is placed in the register $X_{20}$ through the use of the manual switch 42 or the keyboard means 10. In this case, even when the detector 46 develops the detection output upon completion of the address operation to the N-th step, the AND gate $G_4$ does not become conductive. Therefore, the contents of the program memory 14 are not shifted, whereby the same stitch pattern is continuously formed as long as the start switch SWK is closed.

In the embodiment of FIG. 2, the programmed stitch patterns are repeatedly formed as long as the start switch SWK is closed. However, there is a possibility that the programmed stitch patterns are desired to be formed for only one cycle.

Figure 7:
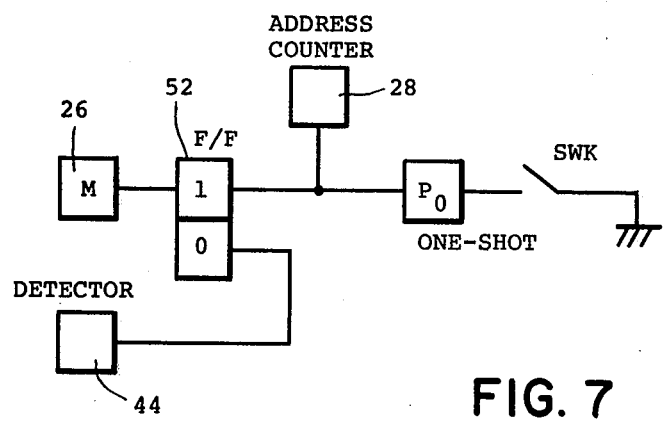
FIG. 7 is a block diagram of an essential part of another embodiment of an electronic sewing machine of the present invention.

FIG. 7 shows an example for conducting the one cycle stitch pattern formation. Like elements corresponding to those of FIG. 2 are indicated by like numerals.

When the start switch SWK is closed, the pulse generator $P_O$ develops the one-shot pulse, which functions not only to reset the address counter 28 but also to set a flip-flop 52. A set output of the flip-flop 52 activates the motor 26 for driving the needle penetration drive mechanism 24. The detection output of the detector 44 is applied to the reset terminal of the flip-flop 52.

As already discussed above, the information "0" is stored in the blocks of the program memory 14 where the stitch selection command is not stored. Accordingly, when the information "0" appears at the register $X_{20}$ of the programme memory 14, the programmed stitch patterns are completely formed by one cycle. When the flip-flop 52 is reset by the detection output of the detector 44, the revolution of the motor 26 is terminated to cease the stitch forming operation.

Figure 8:
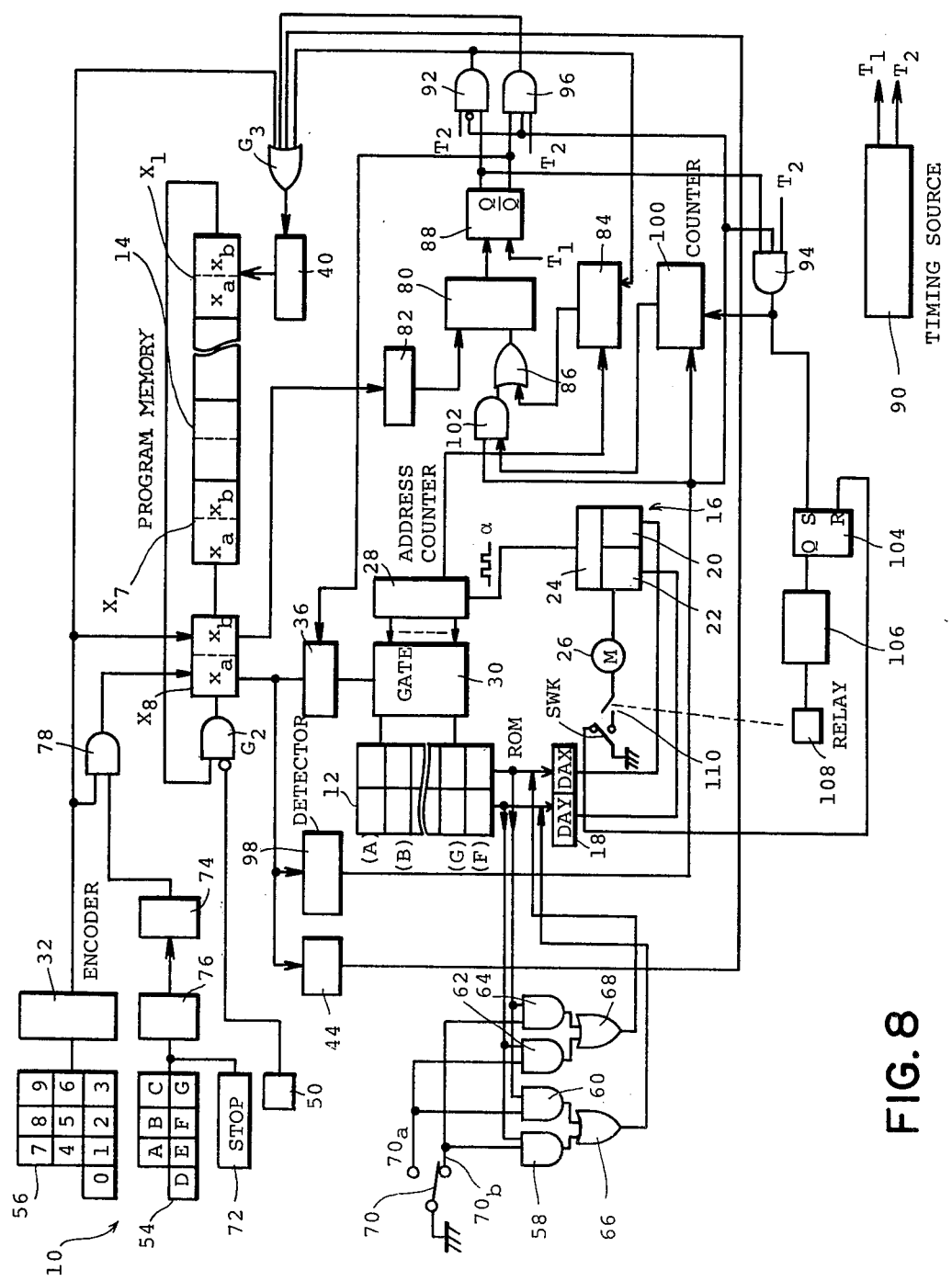
FIG. 8 is a block diagram of still another embodiment of an electronic sewing machine of the present invention.

FIG. 8 shows still another embodiment of the present invention, wherein the program memory can store the information related to the kind of the selected stitch pattern and the repetition number of the selected stitch pattern. Like elements corresponding to those of FIG. 2 are indicated by like numerals.

In this example, the ROM 12 stores (7) kinds of stitch patterns (A) through (G), or, stitch patterns $RX_1$, $RY_1$ through $RX_7$, $RY_7$, and the keyboard means 10 includes command keys 54 for selecting desired stitch patterns and numeral keys 56 for instructing the repetition number of the selected stitch pattern.

Output signals of the ROM 12 are applied to the digital-to-analog converters 18 via gate means 58, 60, 62, 64, 66 and 68. The output signals of the RX side of the ROM 12 are applied to one input terminal of each of the AND gates 60 and 64, and the output signals of the RY side of the ROM 12 are applied to one input terminal of each of the AND gates 58 and 62. The other input terminals of the AND gates 60 and 62 are connected to a terminal $70_a$ of an X-Y selection switch 70, and the other input terminals of the AND gates 58 and 64 are connected to a terminal $70_b$ of the X-Y selection switch 70.

Output signals of the AND gates 58 and 60 are applied to the D-A converter $DA_Y$ through the OR gate 66, and the output signals of the AND gates 62 and 64 are applied to the D-A converter $DA_X$ through the OR gate 68. The X-Y selection switch 70 is normally connected to the terminal $70_b$. Therefore, the output signals of the RX side of the ROM 12 are applied to the D-A converter $DA_X$, and the output signals of the RY side of the ROM 12 are applied to the D-A converter $DA_Y$.

When the X-Y selection switch 70 is connected to the terminal $70_a$, the output signals of the RX side of the ROM 12 are applied to the D-A converter $DA_Y$, and the output signals of the RY side of the ROM 12 are applied to the D-A converter $DA_X$, whereby the stitch pattern is rotated by 90°.

The keyboard means 10 further includes a stop key 72 for introducing the information indicating the end of the program. Output signals of the command keys 54 and the stop key 72 are temporarily stored in a buffer memory 74 via an encoder 76.

In this example, the program memory 14 comprises (8) registers $X_1$ through $X_8$, which include pattern data sections $X_a$ for storing the information related to the kind of the stitch patterns selected through the command keys 54 and repetition number data sections $x_b$ for storing the information related to the repetition number of the stitch pattern conducted through the numeral keys 56.

Output signals of the buffer memory 74 are introduced into the pattern data section $x_a$ of the register $X_8$ through an AND gate 78, and the output signals of the encoder 32 are introduced into the repetition number data section $x_b$ of the register $x_8$. The AND gate 78 functions to introduce the information selected by the command keys 54 into the pattern data section $x_a$ of the register $X_8$ when the numeral keys 56 are operated after operation of the command keys 54.

The contents of the program memory 14 are circulated through the AND gate $G_2$ for sustaining purposes. The output signals of the encoder 32 are applied to the shift control circuit 40 via the OR gate $G_3$.

When a program series is stored in the program memory 14, the stop key 72 and the numeral keys 56 are operated to introduce the information for indicating the end of program and the information related to the repetition number of the program into the program series memory 14.

The output signals of the pattern data section $x_a$ of the register $X_8$ are applied to the gate circuit 30 for selecting the stitch pattern stored in the ROM 12 as in the case of the embodiment of FIG. 2. The output signals of the repetition number data section $x_b$ of the register $X_8$ are applied to a coincidence detection circuit 80 through a gate circuit 82.

A repetition number counter 84 counts up by one when the address counter 28 counts up to N to address the whole information related to a particular stitch pattern stored in the ROM 12. An output signal of the repetition number counter 84 is applied to the coincidence detection circuit 80 via an OR gate 86. When the repetition number of the stitch formation counted by the repetition number counter 84 becomes identical with the desired repetition number selected through the numeral keys 56, the coincidence detection circuit 80 develops a signal to set a flip-flop 88.

The flip-flop 88 receives a timing signal $T_1$ derived from a timing signal generator 90. The set output Q of the flip-flop 88 is applied to AND gates 92 and 94, which receive a timing signal $T_2$ derived from the timing signal generator 90. The timing signal $T_2$ is delayed from the timing signal $T_1$ by a predetermined time interval. The reset output $\overline{Q}$ of the flip-flop 88 is applied to an AND gate 96, which receives the timing signal $T_2$, and to the decoder 36. Output signals of the AND gates 92 and 96 are applied to the shift control circuit 40 via the OR gate $G_3$, and the output signal of the AND gate 92 is also applied to the repetition number counter 84.

A detector 98 is connected to receive the output signal of the pattern data section $x_a$ of the register $X_8$ to develop a detection output when the information indicating the end of the programme appears at the register $X_8$. The detection output of the detector 98 is applied to a counter 100, the AND gates 92, 94 and 96, and an AND gate 102. The detection output of the detector 98 is applied to the AND gate 92 after inversion. The counter 100 counts up by one upon every provision of the detection output of the detector 98, and the output signal of the counter 100 is applied to another input terminal of the AND gate 102. An output signal of the AND gate 102 is applied to the coincidence detection circuit 80 through the OR gate 86.

Accordingly, when the pattern data section $x_a$ of the register $X_8$ stores the command for selecting a particular stitch pattern stored in the ROM 12, the coincidence detection circuit 80 functions to compare the instructed repetition number stored in the repetition number data section $x_b$ of the register $X_8$ with the actual repetition number of the stitch formation counted by the repetition number counter 84. The selected stitch pattern is repeatedly formed till the coincidence detection circuit 80 develops the signal to set the flip-flop 88. When the flip-flop 88 is set, the AND gate 92 is conducted to enable the shift control circuit 40, whereby the contents of the programme memory 14 are shifted right by one block.

When the pattern data section $x_b$ of the register $X_8$ stores the information indicating the end of the programme, the detector 98 develops the detection output, whereby the counter 100 counts up by one. The coincidence detection circuit 80 functions to compare the instructed repetition number of the series of the stitch patterns stored in the repetition number data section $x_b$ of the register $X_8$ with the actual repetition number of the formation of the series of the stitch patterns counted by the counter 100. The AND gate 96 is conductive to enable the shift control circuit 40 till the coincidence detection circuit 80 develops the signal to set the flip flop 88, whereby the desired number of the series of the stitch patterns are continuously formed. When the flip-flop 88 is set, the AND gate 94 becomes conductive.

The detection circuit 44 is connected to receive the output signal of the pattern data section $x_a$ of the register $X_8$, and functions to enable the shift control circuit 40 when the pattern data section $x_a$ of the register $X_8$ stores the information "zero", as in the case of the embodiment of FIG. 2.

The AND gate 94 becomes conductive when the entire steps stored in the program memory 14 have been conducted. An output signal of the AND gate 94 functions to reset the counter 38, and to set a flip-flop 104. The set output of the flip-flop 104 activates a relay driver 106, which energizes a relay 108 to open a relay contact 110 disposed between the start switch SWK and the motor 26. With this arrangement, the revolution of the motor 26 is terminated when the entire programs stored in the program memory 14 has been conducted. The flip-flop 104 is reset when the start switch SWK is released.

Figure 9:
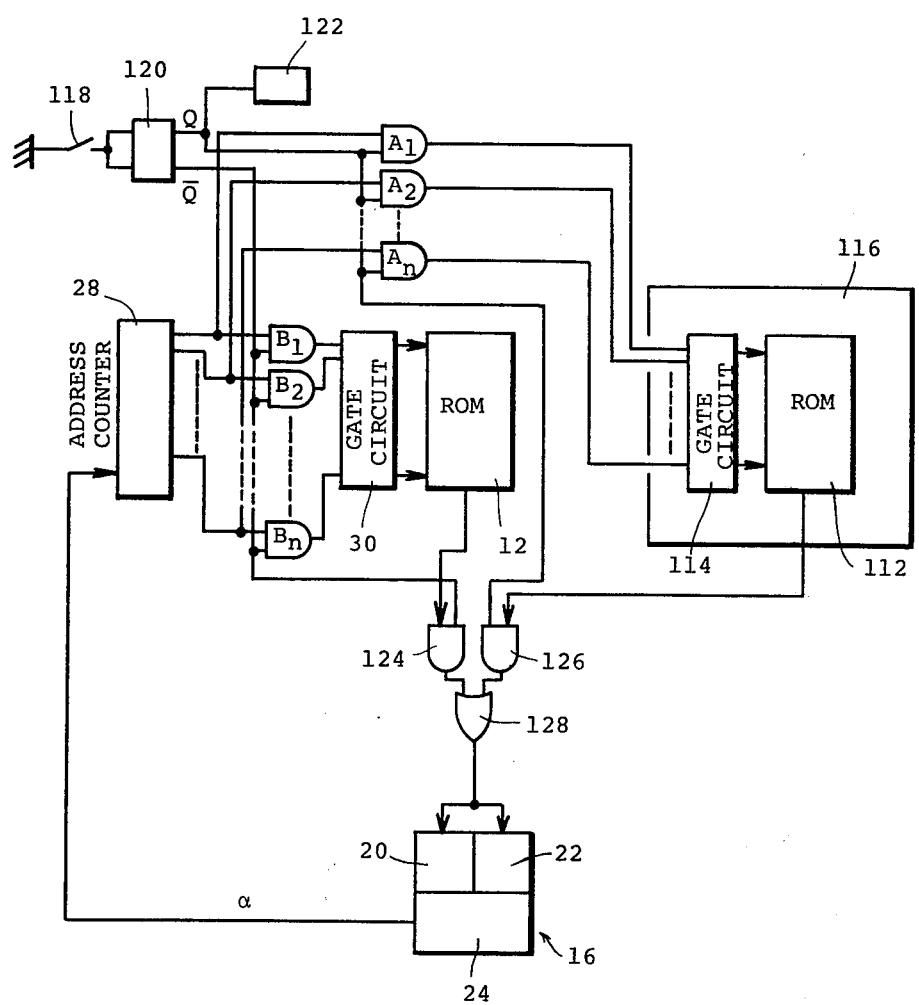
FIG. 9 is a block diagram of yet another embodiment of an electronic sewing machine of the present invention.

FIG. 9 shows yet another embodiment of the present invention, wherein an auxiliary ROM storing additional information of stitch patterns is removably attached to the body of the electronic sewing machine. Like elements corresponding to those of FIG. 2 are indicated by like numerals.

An auxiliary ROM 112 for storing additional information of stitch patterns different from the stitch patterns stored in the ROM 12, and a gate circuit 114 associated with the auxiliary ROM 112 are secured within a package 116 which is removably attached to the body of the electronic sewing machine through a connector.

The output signals of the address counter 28 are applied to the gate circuit 114 associated with the auxiliary ROM 112 through AND gates $A_1$ through $A_n$, and to the gate circuit 30 associated with the ROM 12 through AND gates $B_1$ through $B_n$. The AND gates $A_1$ through $A_n$ and $B_1$ through $B_n$ are controlled by a selection switch 118. When the selection switch 118 is closed, a flip-flop 120 is set to place the AND gates $A_1$ through $A_n$ in the conductive conditions and to enable an indication lamp 122 for indicating that the stitch pattern information is derived from the auxiliary ROM 112. Conversely, when the selection switch 118 is opened, the flip-flop 120 is reset to place the AND gates $B_1$ through $B_n$ in conductive conditions.

The output signals of the ROM 12 are applied to one input terminal of an AND gate 124, the other input terminal of the AND gate 124 receiving the reset output $\overline{Q}$ of the flip-flop 120. The output signals of the auxiliary ROM 112 are applied to one input terminal of another AND gate 126, the other input terminal of which receives the set output Q of the flip-flop 120.

Accordingly, when the selection switch 118 is closed, the information stored in the auxiliary ROM 112 is sequentially addressed through the AND gates $A_1$ through $A_n$ in response to the output signals of the address counter 28, and the information stored in the auxiliary ROM 112 is applied to the stitch forming section 16 via the AND gate 126 and an OR gate 128. When the selection switch 118 is open, the information stored in the ROM 12 is sequentially addressed through the AND gates $B_1$ through $B_n$ in response to the output signals of the address counter 28 and is applied to the stitch forming section 16 via the AND gate 124 and the OR gate 128.

In FIG. 9, the keyboard means 10, the programme memory 14 and the digital-to-analogue converters 18 are omitted from the drawing for the purpose of simplicity.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an electronic sewing machine which forms a stitch pattern by a stitch forming section responding to a needle position controlling signal and a work feed controlling signal, the improvement comprising:
   a memory means for storing digital stitch information related to plural kinds of stitch patterns;
   input means for selecting a desired stitch pattern stored in said memory means;
   a program memory for storing a plurality of selection commands derived from said input means in the order of the selection operation conducted through said input means;
   control means for sequentially developing the digital stitch information related to the stitch pattern which is selected by said selection command stored in said program memory; and
   means for applying the digital stitch information developed by said control means to said stitch forming section as the needle position controlling signal and the work feed controlling signal.

2. The electronic sewing machine of claim 1, wherein said stitch forming section develops a synchronization pulse signal in response to the stitch formation, and said control means are responsive to said synchronization pulse signal, whereby the digital stitch information stored in said memory means is developed in synchronization with the stitch formation.

3. The electronic sewing machine of claim 1, wherein said memory means is a read only memory, and said control means include an address counter for sequentially addressing said read only memory.

4. The electronic sewing machine of claim 3, wherein said address counter is a ring counter.

5. The electronic sewing machine of claim 3, wherein said stitch forming section develops a synchronization pulse signal in response to the stitch formation, and said address counter receives said synchronization pulse signal to count up by one upon every provision of said synchronization pulse signal, whereby the digital stitch information stored in said read only memory is developed in synchronization with the stitch formation.

6. The electronic sewing machine of claim 1, wherein said input means are keyboard means including (10) numeral keys for selecting a desired stitch pattern stored in said memory means.

7. The electronic sewing machine of claim 1, wherein said program memory is a shift register for storing a plurality of selection commands derived from said input means in the order of the selection operation conducted through said input means.

8. The electronic sewing machine of claim 7, wherein said memory means is a read only memory, said stitch forming section develops a synchronization pulse signal in response to the stitch formation, and said control means include an address counter connected to receive said synchronization pulse signal in order to counts up by one upon every provision of said synchronization pulse signal, whereby the digital stitch information stored in said read only memory is developed in synchronization with the stitch formation.

9. The electronic sewing machine of claim 8, further comprising:
   a detection means for developing a detection output when said address counter counts up to the last step; and shift control means for shifting selection commands stored in said shift register in response to said detection output.

10. The electronic sewing machine of claim 8, wherein said read only memory stores the digital stitch information related to the stitch position along the X-axis, and the digital stitch information related to the stitch position along the Y-axis, whereby the digital stitch information related to the stitch position along the X-axis is applied to said stitch forming section as said needle position controlling signal, and the digital stitch information related to the stitch position along the Y-axis is applied to said stitch forming section as said work feed controlling signal.

11. The electronic sewing machine of claim 10, which further comprises a selection means for applying said digital stitch information related to the stitch position along the X-axis to said stitch forming section as said work feed controlling signal, and applying said digital stitch information related to the stitch position along the Y-axis to said stitch forming section as said needle position controlling signal.

12. In an electronic sewing machine which includes a stitch forming section for forming a stitch pattern in response to a needle position controlling signal and a work feed controlling signal, the improvement comprising:
   a memory means for storing digital stitch information related to plural kinds of stitch patterns; keyboard means for introducing selection commands for selecting a desired stitch pattern stored in said memory means;
   a dynamic program memory for storing the selection commands derived from said keyboard means; means for selecting the desired stitch pattern stored in said memory means in accordance with the selection commands stored in said dynamic program memory; a synchronization pulse signal generator for developing a synchronization pulse signal in response to stitch formation conducted by said stitch forming section; an address counter connected to receive said synchronization pulse signal for sequentially addressing the digital stitch information related to the selected stitch pattern stored in said memory means; and means for applying the digital stitch information derived from said memory means to said stitch forming section as the needle position controlling signal and the work feed controlling signal.

13. The electronic sewing machine of claim 12, wherein the dynamic program memory is a shift register for storing a plurality of the selection commands derived from said keyboard means in the order of the selection operation conducted through said keyboard means.

14. The electronic sewing machine of claim 13, further comprising:
a detection means for developing a detection output when said address counter counts up to the last step; and shift control means for shifting the selection commands stored in said shift register in response to said detection output.

15. The electronic sewing machine of claim 14, wherein the shift control means include a manual switch for precluding said shift operation even when said detection output is developed.

16. The electronic sewing machine of claim 15, wherein the shift control means include an AND gate connected to receive said detection output and a signal derived from said manual switch.

17. The electronic sewing machine of claim 12, which further comprises a display means for indicating said selection commands stored in said dynamic program memory.

18. A digital control circuit for an electronic sewing machine which includes a stitch forming section for forming a stitch pattern in response to a needle position controlling signal and a work feed controlling signal, said digital control circuit comprising:
a. a memory means for storing digital stitch information related to plural kinds of stitch patterns;
b. input means for selecting a desired stitch pattern stored in said memory means;
c. a program memory for storing a plurality of selection commands derived from said input means in the order of the selection operation conducted through said input means;
d. control means for sequentially developing the digital stitch information related to the stitch pattern which is selected by said selection command stored in said program memory; and
e. means for applying the digital stitch information developed by said control means to said stitch forming section as the needle position controlling signal and the work feed controlling signal.

19. The digital control circuit of claim 18, wherein said memory means is a read only memory, and said control means include an address counter for sequentially addressing said read only memory.

20. The digital control circuit of claim 18, wherein said input means are keyboard means including (10) numeral keys for selecting a desired stitch pattern stored in said memory means.

21. In an electronic sewing machine which includes a stitch forming section for forming a stitch pattern in response to a needle position controlling signal and a work feed controlling signal, the improvement comprising:
a memory means for storing digital stitch information related to plural kinds of stitch patterns; input means for introducing selection commands for selecting a desired stitch pattern stored in said memory means, and for introducing repetition commands for instructing the repetition number of the selected stitch pattern;
a program memory for storing the selection commands and the repetition commands derived from said input means; means for selecting the desired stitch pattern stored in said memory means in accordance with the selection commands stored in said program memory; and means for sequentially applying the digital stitch information derived from said memory means to said stitch forming section as the needle position controlling signal and the work feed controlling signal.

22. The electronic sewing machine of claim 21, further comprising:
a synchronization pulse signal generator for developing a synchronization pulse signal in response to stitch formation conducted by said stitch forming section; and an address counter connected to receive said synchronization pulse signal for sequentially addressing the digital stitch information related to the selected stitch pattern stored in said memory means.

23. The electronic sewing machine of claim 21, further comprising: a counter for counting the number of the stitch pattern formation conducted by said stitch forming section; and a coincidence detection circuit for comparing the number of the stitch pattern formation counted by said counter with the repetition commands stored in said programme memory.

24. In an electronic sewing machine which forms a stitch pattern by a stitch forming section responding to a needle position controlling signal and a work feed controlling signal, the improvement comprising:
a memory for storing digital stitch information related to plural kinds of stitch patterns;
input means for selecting a desired stitch pattern stored in said memory means;
a program memory for storing selection commands derived from said input means;
control means for sequentially developing the digital stitch information related to the stitch pattern which is selected by said selection command stored in said program memory;
means for applying the digital stitch information developed by said control means to said stitch forming section as the needle position controlling signal and the work feed controlling signal; and
a mode selection switch for placing the electronic sewing machine in a single stitch formation mode wherein only one type of stitch pattern is formed.

* * * * *

UNITED STATES PATENT AND TRADEMARK OFFICE
CERTIFICATE OF CORRECTION

PATENT NO. : 4,122,786
DATED : October 31, 1978
INVENTOR(S) : Akira TANIMOTO, Sunao KATOH and Yukihiro YOSHIDA It is certified that error appears in the above-identified patent and that said Letters Patent are hereby corrected as shown below:

IN THE HEADING OF THE PATENT:

Under [75] Inventors, change the first name of the second inventor from "Sanao" to --Sunao--.

Signed and Sealed this

Twenty-fourth Day of April 1979

[SEAL]

Attest:

RUTH C. MASON
Attesting Officer

DONALD W. BANNER
Commissioner of Patents and Trademarks